United States Patent
Proctor, Jr.

(10) Patent No.: US 7,602,749 B2
(45) Date of Patent: Oct. 13, 2009

(54) FAST ACQUISITION OF TRAFFIC CHANNELS FOR A HIGHLY VARIABLE DATA RATE REVERSE LINK OF A CDMA WIRELESS COMMUNICATION SYSTEM

(75) Inventor: James A. Proctor, Jr., Indialantic, FL (US)

(73) Assignee: InterDigital Corporation, Wilmington, DE (US)

( * ) Notice: Subject to any disclaimer, the term of this patent is extended or adjusted under 35 U.S.C. 154(b) by 990 days.

(21) Appl. No.: 10/179,121

(22) Filed: Jun. 24, 2002

(65) Prior Publication Data

US 2002/0163898 A1 Nov. 7, 2002

Related U.S. Application Data

(63) Continuation of application No. 09/515,487, filed on Feb. 29, 2000, now Pat. No. 6,452,913, which is a continuation-in-part of application No. 09/088,413, filed on Jun. 1, 1998, now Pat. No. 6,222,832.

(51) Int. Cl.
*H04B 7/216* (2006.01)
(52) U.S. Cl. .................. 370/335; 370/342; 370/441
(58) Field of Classification Search .......... None
See application file for complete search history.

(56) References Cited

U.S. PATENT DOCUMENTS

| | | | |
|---|---|---|---|
| 4,107,469 A | 8/1978 | Jenkins | |
| 4,577,316 A | 3/1986 | Schiff | 370/104 |
| 4,625,308 A | 11/1986 | Kim et al. | |
| 4,675,863 A | 6/1987 | Paneth et al. | 370/50 |
| 4,817,089 A | 3/1989 | Paneth et al. | 370/95 |

(Continued)

FOREIGN PATENT DOCUMENTS

EP 443061 8/1991

(Continued)

OTHER PUBLICATIONS

Chih-Lin I et al., Multi-Code CDMA Wireless Personal Communications Networks, Jun. 18, 1005.

(Continued)

*Primary Examiner*—Michael J Moore, Jr.
(74) *Attorney, Agent, or Firm*—Volpe and Koenig, P.C.

(57) ABSTRACT

A service option overlay for a CDMA wireless communication in which multiple allocatable subchannels are defined on a reverse link by assigning different code phases of a given long pseudonoise (PN) code to each subchannel. The instantaneous bandwidth needs of each on-line subscriber unit are then met by dynamically allocating none, one, or multiple subchannels on an as needed basis for each network layer connection. The system efficiently provides a relatively large number of virtual physical connections between the subscriber units and the base stations on the reverse link for extended idle periods such as when computers connected to the subscriber units are powered on, but not presently actively sending or receiving data. These maintenance subchannels permit the base station and the subscriber units to remain in phase and time synchronism. This in turn allows fast acquisition of additional subchannels as needed by allocating new code phase subchannels. Preferably, the code phases of the new channels are assigned according to a predetermined code phase relationship with respect to the code phase of the corresponding maintenance subchannel.

9 Claims, 5 Drawing Sheets

U.S. PATENT DOCUMENTS

| | | | |
|---|---|---|---|
| 4,841,526 A | 6/1989 | Wilson et al. | |
| 4,862,453 A | 8/1989 | West et al. | 370/82 |
| 4,866,709 A | 9/1989 | West et al. | 370/82 |
| 4,912,705 A | 3/1990 | Paneth et al. | 370/95.1 |
| 4,949,395 A | 8/1990 | Rydbeck | |
| 5,022,024 A | 6/1991 | Paneth et al. | 370/50 |
| 5,027,348 A | 6/1991 | Curry | |
| 5,027,400 A | 6/1991 | Baji et al. | |
| 5,068,916 A | 11/1991 | Harrison et al. | |
| 5,101,416 A | 3/1992 | Fenton et al. | |
| 5,103,459 A | 4/1992 | Gilhousen et al. | 375/1 |
| 5,114,375 A | 5/1992 | Wellhausen et al. | 446/246 |
| 5,115,309 A | 5/1992 | Hang | |
| 5,226,044 A | 7/1993 | Gupta et al. | |
| 5,268,900 A | 12/1993 | Hluchyj et al. | |
| 5,282,222 A | 1/1994 | Fattouche et al. | 375/1 |
| 5,325,419 A | 6/1994 | Connolly et al. | 379/60 |
| 5,353,332 A | 10/1994 | Raith et al. | |
| 5,355,374 A | 10/1994 | Hester et al. | |
| 5,373,502 A | 12/1994 | Turban | 370/18 |
| 5,375,124 A | 12/1994 | D'Ambrogio, et al. | |
| 5,388,102 A | 2/1995 | Griffith et al. | |
| 5,394,473 A | 2/1995 | Davidson | |
| 5,412,429 A | 5/1995 | Glover | 348/398 |
| 5,414,728 A | 5/1995 | Zehavi | 375/200 |
| 5,442,625 A | 8/1995 | Gitlin et al. | 370/18 |
| 5,446,727 A | 8/1995 | Bruckert et al. | 370/18 |
| 5,463,629 A | 10/1995 | Ko | |
| 5,471,463 A | 11/1995 | Hulbert | |
| 5,481,533 A | 1/1996 | Honig et al. | |
| 5,490,136 A | 2/1996 | Sereno et al. | 370/468 |
| 5,511,068 A | 4/1996 | Sato | |
| 5,559,789 A | 9/1996 | Nakano et al. | |
| 5,581,575 A | 12/1996 | Zehavi et al. | |
| 5,585,850 A | 12/1996 | Schwaller | 348/388 |
| 5,586,119 A | 12/1996 | Scribano et al. | 370/350 |
| 5,590,409 A | 12/1996 | Sawahashi et al. | |
| 5,592,470 A | 1/1997 | Rudrapatna et al. | 370/468 |
| 5,592,471 A | 1/1997 | Briskman | |
| 5,598,416 A | 1/1997 | Yamada et al. | |
| 5,606,580 A | 2/1997 | Mourot et al. | |
| 5,617,423 A | 4/1997 | Li et al. | 370/426 |
| 5,619,492 A | 4/1997 | Press et al. | 370/441 |
| 5,619,524 A | 4/1997 | Ling et al. | |
| 5,642,348 A | 6/1997 | Barzegar et al. | 370/277 |
| 5,642,377 A * | 6/1997 | Chung et al. | 375/145 |
| 5,655,001 A | 8/1997 | Cline et al. | 370/328 |
| 5,657,358 A | 8/1997 | Panech et al. | 375/356 |
| 5,663,958 A | 9/1997 | Ward | |
| 5,663,990 A | 9/1997 | Bolgiano et al. | 375/347 |
| 5,673,259 A | 9/1997 | Quick, Jr. | 370/342 |
| 5,687,194 A | 11/1997 | Paneth et al. | 375/283 |
| 5,689,502 A | 11/1997 | Scott | 370/281 |
| 5,697,059 A | 12/1997 | Carney | 455/34.1 |
| 5,699,364 A | 12/1997 | Sato et al. | |
| 5,708,656 A | 1/1998 | Noneman et al. | |
| 5,715,236 A | 2/1998 | Gilhousen et al. | |
| 5,734,646 A | 3/1998 | I et al. | 370/335 |
| 5,742,592 A | 4/1998 | Scholefield et al. | 370/329 |
| 5,745,484 A | 4/1998 | Scott | 370/347 |
| 5,758,288 A | 5/1998 | Dunn et al. | 455/456 |
| 5,781,542 A | 7/1998 | Tanaka et al. | |
| 5,781,543 A | 7/1998 | Ault et al. | |
| 5,784,406 A | 7/1998 | DeJaco et al. | 375/224 |
| 5,790,549 A | 8/1998 | Dent | 370/479 |
| 5,790,551 A | 8/1998 | Chan | 370/458 |
| 5,793,744 A | 8/1998 | Kanerva et al. | |
| 5,802,046 A | 9/1998 | Scott | 370/280 |
| 5,802,465 A | 9/1998 | Hamalainen et al. | |
| 5,812,131 A * | 9/1998 | Bertram | 715/798 |
| 5,825,807 A | 10/1998 | Kumar | |
| 5,828,659 A | 10/1998 | Teder et al. | 370/328 |
| 5,828,662 A | 10/1998 | Jalali et al. | 370/335 |
| 5,841,768 A | 11/1998 | Ozluturk et al. | |
| 5,844,894 A | 12/1998 | Dent | 370/330 |
| 5,845,211 A | 12/1998 | Roach | |
| 5,854,786 A | 12/1998 | Henderson et al. | |
| 5,856,971 A | 1/1999 | Gitlin et al. | 370/335 |
| 5,859,840 A | 1/1999 | Tiedemann, Jr. et al. | 370/335 |
| 5,859,879 A | 1/1999 | Bolgiano et al. | |
| 5,872,786 A | 2/1999 | Shobatake | |
| 5,881,060 A | 3/1999 | Morrow et al. | |
| 5,881,368 A | 3/1999 | Grob et al. | |
| 5,884,196 A | 3/1999 | Lekven et al. | |
| 5,894,473 A | 4/1999 | Dent | |
| 5,896,376 A | 4/1999 | Alperovich et al. | |
| 5,898,929 A | 4/1999 | Haartsen | |
| 5,910,944 A | 6/1999 | Callicotte et al. | |
| 5,910,945 A | 6/1999 | Garrison et al. | 370/324 |
| 5,914,950 A | 6/1999 | Tiedemann, Jr. et al. | 370/348 |
| 5,923,650 A | 7/1999 | Chen et al. | 370/331 |
| 5,930,230 A | 7/1999 | Odenwalder et al. | 370/208 |
| 5,950,131 A | 9/1999 | Vilmur | 455/434 |
| 5,956,332 A | 9/1999 | Rasanen et al. | |
| 5,959,980 A | 9/1999 | Scott | 370/280 |
| 5,966,374 A | 10/1999 | Rasanen | |
| 5,991,279 A | 11/1999 | Haugli et al. | 370/311 |
| 6,001,800 A | 12/1999 | Mehta et al. | |
| 6,002,690 A | 12/1999 | Takayama et al. | |
| 6,005,852 A | 12/1999 | Kokko et al. | |
| 6,005,855 A | 12/1999 | Zehavi et al. | 370/335 |
| 6,009,106 A | 12/1999 | Rustad et al. | |
| 6,011,800 A | 1/2000 | Nadgauda et al. | |
| 6,016,312 A | 1/2000 | Storn et al. | |
| 6,028,868 A | 2/2000 | Yeung et al. | 370/515 |
| 6,031,827 A * | 2/2000 | Rikkinen et al. | 370/330 |
| 6,049,535 A * | 4/2000 | Ozukturk et al. | 370/335 |
| 6,049,538 A | 4/2000 | Scott | 370/347 |
| 6,052,385 A | 4/2000 | Kanerva et al. | |
| 6,058,338 A | 5/2000 | Agashe et al. | 701/13 |
| 6,064,678 A | 5/2000 | Sindhushayana et al. | 370/470 |
| 6,069,880 A | 5/2000 | Owen et al. | |
| 6,069,883 A | 5/2000 | Ejzak et al. | 370/335 |
| 6,078,572 A | 6/2000 | Tanno et al. | 370/335 |
| 6,081,536 A | 6/2000 | Gorsuch et al. | |
| 6,088,335 A | 7/2000 | I et al. | 370/252 |
| 6,094,421 A | 7/2000 | Scott | 270/280 |
| 6,094,576 A | 7/2000 | Häkkinen et al. | |
| 6,097,733 A | 8/2000 | Basu et al. | |
| 6,101,176 A | 8/2000 | Honkasalo et al. | |
| 6,104,708 A * | 8/2000 | Bergamo | 370/320 |
| 6,111,863 A | 8/2000 | Rostoker et al. | |
| 6,112,092 A | 8/2000 | Benveniste | 455/450 |
| 6,115,370 A | 9/2000 | Struhsaker et al. | |
| 6,134,233 A | 10/2000 | Kay | 370/350 |
| 6,151,332 A | 11/2000 | Gorsuch et al. | |
| 6,157,619 A | 12/2000 | Ozluturk et al. | 370/252 |
| 6,161,013 A | 12/2000 | Anderson et al. | 455/435 |
| 6,163,707 A | 12/2000 | Miller | |
| 6,169,731 B1 | 1/2001 | Stewart et al. | |
| 6,195,362 B1 | 2/2001 | Darcie et al. | |
| 6,196,362 B1 | 2/2001 | Darcie et al. | 370/431 |
| 6,198,723 B1 | 3/2001 | Parruck et al. | |
| 6,208,871 B1 | 3/2001 | Hall et al. | 455/517 |
| 6,212,175 B1 | 4/2001 | Harsch | |
| 6,214,342 B1 | 4/2001 | Rege | |
| 6,215,798 B1 | 4/2001 | Carneheim et al. | 370/515 |
| 6,219,342 B1 | 4/2001 | Rege | |
| 6,222,828 B1 | 4/2001 | Ohlson et al. | 370/320 |
| 6,222,832 B1 | 4/2001 | Proctor | |
| 6,226,527 B1 | 5/2001 | Dalsgaard et al. | 455/553 |
| 6,233,439 B1 | 5/2001 | Jalali | |
| 6,236,647 B1 | 5/2001 | Amalfitano | |
| 6,243,372 B1 | 6/2001 | Petch et al. | 370/350 |

| | | | |
|---|---|---|---|
| 6,246,673 B1 | 6/2001 | Tiedemann, Jr. et al. | 370/333 |
| 6,256,509 B1 | 7/2001 | Tanaka et al. | |
| 6,259,683 B1 | 7/2001 | Sekine et al. | 370/328 |
| 6,262,980 B1 | 7/2001 | Leung et al. | 370/336 |
| 6,263,013 B1 | 7/2001 | Hendrickson | 375/208 |
| 6,269,075 B1 | 7/2001 | Tran | 370/206 |
| 6,269,088 B1 | 7/2001 | Masui et al. | 370/335 |
| 6,272,168 B1 | 8/2001 | Lomp et al. | 375/206 |
| 6,278,701 B1 | 8/2001 | Ayyagari et al. | |
| 6,285,665 B1 | 9/2001 | Chuah | 370/319 |
| 6,307,840 B1 | 10/2001 | Wheatley, III et al. | 370/252 |
| 6,310,859 B1 | 10/2001 | Morita et al. | |
| 6,320,851 B1 | 11/2001 | Kim et al. | |
| 6,353,412 B1 | 3/2002 | Soliman | 342/387 |
| 6,356,555 B1* | 3/2002 | Rakib et al. | 370/441 |
| 6,366,570 B1 | 4/2002 | Bhagalia | 370/342 |
| 6,366,786 B1 | 4/2002 | Norman et al. | |
| 6,370,117 B1 | 4/2002 | Koraitim et al. | |
| 6,373,830 B1 | 4/2002 | Ozluturk | 370/335 |
| 6,373,834 B1 | 4/2002 | Lundh et al. | 370/350 |
| 6,377,548 B1 | 4/2002 | Chuah | 370/233 |
| 6,377,809 B1 | 4/2002 | Rezaiifar et al. | 455/455 |
| 6,388,999 B1 | 5/2002 | Gorsuch et al. | |
| 6,389,000 B1 | 5/2002 | Jou | 370/342 |
| 6,396,804 B2 | 5/2002 | Odenwalder | 370/209 |
| 6,418,148 B1 | 7/2002 | Kumar et al. | 370/468 |
| 6,426,960 B2 | 7/2002 | Antonio | |
| 6,452,911 B1 | 9/2002 | Seo | |
| 6,452,913 B1* | 9/2002 | Proctor, Jr. | 370/335 |
| 6,456,608 B1 | 9/2002 | Lomp | 370/335 |
| 6,469,991 B1 | 10/2002 | Chuah | 370/329 |
| 6,473,623 B1 | 10/2002 | Benveniste | 455/522 |
| 6,498,785 B1 | 12/2002 | Derryberry et al. | |
| 6,498,790 B1 | 12/2002 | Shaheen et al. | |
| 6,504,830 B1 | 1/2003 | Ostberg et al. | 370/342 |
| 6,519,452 B1 | 2/2003 | Agostino et al. | |
| 6,519,651 B1 | 2/2003 | Dillon | 709/250 |
| 6,526,039 B1 | 2/2003 | Dahlman et al. | 370/350 |
| 6,526,064 B1 | 2/2003 | Bousquet | |
| 6,526,281 B1 | 2/2003 | Gorsuch et al. | |
| 6,532,365 B1 | 3/2003 | Anderson et al. | 455/437 |
| 6,542,481 B2 | 4/2003 | Foore et al. | |
| 6,545,986 B1 | 4/2003 | Stellakis | 370/318 |
| 6,545,994 B2 | 4/2003 | Nelson et al. | |
| 6,567,416 B1 | 5/2003 | Chuah | 370/418 |
| 6,570,865 B2 | 5/2003 | Masui et al. | 370/342 |
| 6,571,296 B1 | 5/2003 | Dillon | 709/250 |
| 6,574,211 B2 | 6/2003 | Padovani et al. | 370/347 |
| 6,587,446 B2 | 7/2003 | Sarkar et al. | |
| 6,597,913 B2 | 7/2003 | Natarajan | 455/452 |
| 6,633,554 B1 | 10/2003 | Dalal | |
| 6,687,509 B2 | 2/2004 | Schmutz et al. | |
| 6,690,938 B1 | 2/2004 | Chin | |
| 6,724,743 B1 | 4/2004 | Pigeonnat | |
| 6,768,727 B1 | 7/2004 | Sourour et al. | |
| 6,775,558 B1* | 8/2004 | Ranta et al. | 455/557 |
| 6,795,416 B1 | 9/2004 | Han et al. | |
| 6,826,169 B1 | 11/2004 | Nagatani et al. | |
| 6,831,910 B1 | 12/2004 | Moon et al. | |
| 6,956,840 B1 | 10/2005 | Proctor, Jr. | |
| 6,963,540 B2 | 11/2005 | Choi et al. | |
| 6,999,471 B1 | 2/2006 | Frazer et al. | |
| 2001/0038674 A1 | 11/2001 | Trans | |
| 2002/0012332 A1 | 1/2002 | Tiedemann et al. | |
| 2003/0060224 A1 | 3/2003 | Nelson et al. | |
| 2003/0123401 A1 | 7/2003 | Dean | |
| 2004/0009785 A1 | 1/2004 | Nelson et al. | |
| 2004/0160910 A1 | 8/2004 | Gorsuch et al. | |
| 2004/0180696 A1 | 9/2004 | Foore et al. | |

FOREIGN PATENT DOCUMENTS

| | | |
|---|---|---|
| EP | 0 526 106 A2 | 2/1993 |
| EP | 526106 | 2/1993 |
| EP | 635949 | 1/1995 |
| EP | 0 682 423 A2 | 11/1995 |
| EP | 682423 | 11/1995 |
| EP | 682426 | 11/1995 |
| EP | 0 720 309 A2 | 12/1995 |
| EP | 720309 | 12/1995 |
| EP | 0 719 062 A2 | 6/1996 |
| EP | 719062 | 6/1996 |
| FR | 2761557 | 1/1998 |
| GB | 2326524 | 12/1998 |
| GB | GB 2 326 524 A | 12/1998 |
| JP | 07-264098 | 10/1995 |
| JP | 08-065273 | 3/1996 |
| WO | 95/08900 | 3/1995 |
| WO | 96/08934 | 3/1996 |
| WO | WO 96/08934 | 3/1996 |
| WO | 96/37081 | 11/1996 |
| WO | WO 96/37081 | 11/1996 |
| WO | 96/27994 | 12/1996 |
| WO | 97/23073 | 6/1997 |
| WO | 97/26726 | 7/1997 |
| WO | WO 97/26726 | 7/1997 |
| WO | 97/32412 | 9/1997 |
| WO | 97/46044 | 12/1997 |
| WO | 99/31811 | 6/1999 |
| WO | WO 99/31811 | 6/1999 |
| WO | 99/52306 | 10/1999 |
| WO | WO 99/52306 | 10/1999 |
| WO | 99/63682 | 12/1999 |
| WO | WO 99/63682 | 12/1999 |

OTHER PUBLICATIONS

Chih-Lin I et al., IS-95 Enhancements for Multimedia Services, Bell Labs Technical Journal, pp. 60-87, Autumn 1996.

Chih-Lin I et al., Performance of Multi-Code CDMA Wireless Personal Communications Networks, Jul. 25, 1995.

Liu et al., Channel Access and Interference Issues in Multi-Code DS-CDMA Wireless Packet (ATM) Networks, Wireless Networks 2, pp. 173-196, 1996.

Chih-Lin I et al., Load and Interference Based Demand Assignment (LIDA) for Integrated Services in CDMA Wireless Systems, Nov. 18, 1996, pp. 235-241.

Budka et al., Cellular Digital Packet Data Networks, Bell Labs Technical Journal, Summer 1997, pp. 164-181.

Cellular Digital Packet Data, System Specification, Release 1.1, Jan. 19, 1995.

Data Standard, Packet Data Section, PN-3676.5 (to be published as TIA/EIA/IS-Data.5), Dec. 8, 1996, Version 02 (Content Revision 03).

Data Service Options for Wideband Spread Spectrum Systems: Introduction, PN-3676.1 (to be published as TIA/EIA/IS-707.1), Mar. 20, 1997 (Content Revision 1).

Packet Data Service Option Standard for Wideband Spread Spectrum Systems, TIA/EIA Interim Standard, TIA/EIA/IS-657, Jul. 1996.

Mobile Station-Base Station Compatibility Standard for Dual-Mode Wideband Spread Spectrum Cellular System, TIA Interim Standard, TIA/EIA/IS-95-A (Addendum to TIA/EIA/IS-95), May 1995.

Mobile Station-Base Station Compatibility Standard for Wideband Spread Spectrum Cellular Systems, TIA/EIA Standard, TIA/EIA-95-B (Upgrade and Revision of TIA/EIA-95-A), Mar. 1999.

Network Wireless Systems Offer Business Unit (NWS OBU), Feature Definition Document for Code Division Multiple Access (CDMA) Packet Mode Data Services, FDD-1444, Nov. 26, 1996.

Draft Text for "95C" Physical Layer (Revision 4), Part 2, Document #531-981-20814-95C, part 2 on 3GGP2 website (ftp://ftp.3gpp2.org/tsgc/working/1998/1298_Maui/WG3-TG1/531-98120814-95c,%20part%202.pdf, 1998).

Draft Text for "*95C" Physical Layer (Revision 4), Part 1, Document #531-981-20814-95C, Part 1 on 3GPP2 website (ftp://ftp.3gpp2.org/tsgc/working/1998/1298_Maui/WG3-TG1/531-98120814-95c,%20part%201.pdf).

Reed et al., Iterative Multiuser Detection for CDMA with FEC: Near-Single-User Performance, IEEE Transactions on Communications, vol. 46, No. 12, Dec. 1998, pp. 1693-1699.

Hindelang et al., Using Powerful "Turbo" Codes for 14.4 Kbit/s Data Service in GSM or PCS Systems, IEEE Global Communications Conference, Phoenix, Arizona, USA, Nov. 3-8, 1997, vol. II, pp. 649-653.

Kaiser et al., Multi-Carrier CDMA with Iterative Decoding and Soft-Interference Cancellation, Proceedings of Globecom 1997, vol. 1, pp. 523-529.

Wang et al., The Performance of Turbo-Codes in Asynchronous DS-CDMA, IEEE Global Communications Conference, Phoenix, Arizona, USA, Nov. 3-8, 1007, Gol. III, pp. 1548-1551.

Hall et al., Design and Analysis of Turbo Codes on Rayleigh Fading Channels, IEEE Journal on Selected Areas in Communications, vol. 16, No. 2, Feb. 1998, pp. 160-174.

High Data Rate (HDR) Solution, Qualcomm, Dec. 1998.

Azad et al., Multirate Spread Spectrum Direct Sequence CDMA Techniques, 1994, The Institute of Electrical Engineers.

Ejzak et al., Lucent Technologies Air Interface Proposal for CDMA High Speed Data Service, Revision 0.1, May 5, 1997.

Knisely, Lucent Technologies Air Interface Proposal for CDMA High Speed Data Service, Jan. 16, 1997.

Kumar et al, An Access Scheme for High Speed Packet Data Service on IS-95 based CDMA, Feb. 11, 1997.

Ejzak et al., Lucent Technologies Air Interface Proposal for CDMA High Speed Data Service, Apr. 14, 1997.

Lucent Technologies Presentation First Slide Titled, Summary of Multi-Channel Signaling Protocol, Apr. 6, 1997.

Lucent Technologies Presentation First Slide Titled, Why Support Symmetric HSD (Phase 1C), Feb. 21, 1997.

Krzymien et al., Rapid Acquisition Algorithms for Synchronization of Bursty Transmissions in CDMA Microcellular and Personal Wireless Systems, IEEE Journal on Selected Areas in Communications, vol. 14, No. 3, Apr. 1996, pp. 570-579.

Chih-Lin I et al., Variable Spreading Gain CDMA with Adaptive Control for True Packet Switching Wireless Network, 1995, pp. 725-730.

Skinner et al., Performance of Reverse-Link Packet Transmission in Mobile Cellular CDMA Networks, IEEE, 2001, pp. 1019-1023.

Lau et al., A Channel-State-Dependent Bandwidth Allocation scheme for Integrated Isochronous and Bursty Media Data in a Cellular Mobile Information System, IEEE, 2000, pp. 524-528.

Elhakeem, Congestion Control in Signalling Free Hybrid ATM/CDMA Satellite Network, IEEE, 1995, pp. 783-787.

Chung, Packet Synchronization and Identification for Incremental Redundancy Transmission in FH-CDMA Systems, 1992, IEEE, pp. 292-295.

High Data Rate (HDR), cdmaOne optimized for high speed, high capacity data, Wireless Infrastructure, Qualcomm, Sep. 1998.

Viterbi, The Path to Next Generation Services with CDMA, Qualcomm Incorporated, 1998 CDMA Americas Congress, Los Angeles, California, Nov. 19, 1998.

Melanchuk, et al., "CDPD and Emerging Digital Cellular Systems," *Digest of Papers of COMPCON*, Computer Society Conference 1996, Technologies for the Information Superhighway, Santa Clara, CA., No. CONF. 41, pp. 2-8 (Feb. 25, 1996), XP000628458 Institute of Electrical and Electronics Engineers.

Heine, Gunnar, "The Air-Interface of GSM," in *GSM Networks: Protocols, Terminology, and Implementation*, (MA: Artech House, Inc.), pp. 89-100 (1999).

Ovesjö Fredrik, European Telecommunication Standard, SMG2 UMTS physical Layer Expert Group, "*UTRA Physical Layer Descriptions FDD parts*" (v0.4, Jun. 25, 1998), pp. 1-41, XP-002141421.

Bell Labs Technical Journal, Lucent Technologies, vol. 2, No. 3, Summer 1997.

Puleston, PPP Protocol Spoofing Control Protocol, Global Village Communication (UK) Ltd., Feb. 1996.

Chung, Packet Synchronization and Identification for Incremental Redundancy Transmission in FH-CDMA Systems, 1992, IEEE, pp. 292-295.

Melanchuk et al. *CDPD and Emerging Digital Cellular Systems*, Digest of Papers of COMPCN, Computer Society Conference 1996, Santa Clara, CA, No. CONF. 41, Feb. 25, 1996, pp. 2-8, XP000628458.

Simpson, W. (Editor). "RFC 1661—The Point-to-Point Protocol (PPP)." Network Working Group, Jul. 1994, pp. 1-35, http://www.faqs.org/rfcs/rfc1661.html.

Simpson, W. (Editor). "RFC 1662—PPP in HDLC-Like Framing." Network Working Group, Jul. 1994, pp. 1-17. http://www.faqs.org/rfcs/rfc1662.html.

Stage 1 Service Description for Data Services—High Speed Data Services (Version 0.10) CDG RF 38. Dec. 3, 1996.

*Support for 14.4 kbps Data Rate and PCS Interaction for Wideband Spread Spectrum Cellular Systems*. TSB74, Dec. 1995. TIA/EIA Telecommunications Systems Bulletin.

*MSC-BS Interface for Public 800 MHz*.TIA/EIA/IS-634. TIA/EIA Interim Standard, Dec. 1995.

*MSC-BS Interface (A-Interface) for Public 800 MHz*. TIA/EIA/IS-634-A. TIA/EIA Interim Standard (Revision of TIA/EIA/IS-634) Jul. 1998.

Honkasalo, Harri. *High Speed Data Air Interface*. 1996.

*Data Services Option Standard for Wideband Spread Spectrum Digital Cellular System*. TIA/EIA/IS-99. TIA/EIA Interim Standard. Jul. 1995.

Knisely, Douglas, N. Telecommunications Industry Association Subcommittee TR-45.5—*Wideband Spread Spectrum Digital Technologies Standards*. Banff, Alberta. Feb. 24, 1997 (TR45.5/97.02.24)21.

Ott, David TR45.5, CDMA WBSS Technical Standards Meeting Summary. Feb. 24-28, 1997 Banff, Alberta.

Ejzak, et al. *Proposal for High Speed Packet Data Service, Version 0.1*. Lucent Technologies, Jan. 16, 1997.

Attachment 2, *High Speed Data RLP* Lucent Technologies, Version 0.1, Jan. 16, 1997.

*Data Services Options Standard for Wideband Spread Spectrum Systems: Packet Data Services*. PN-3676.5 (to be published as TIA/EIA/IS-707.5) Ballot Version, May 30, 1997.

*Telecommunications Industry Association Meeting Summary*. Task Group I, Working Group III, Subcommittee TR45.5. Feb. 24-27, 1997. Banff, Alberta.

WWW.CDG.ORG/NEWS/PRESS/1997.ASP. CDA Press Release Archive, 1997.

*Physical Layer Standard for cdma2000 Spread Spectrum Systems, Release C*. TIA/EIA Interim Standard. TIA/EIA/IS-2000.2C. May 2002.

*Data Service Options for Wideband Spread Spectrum Systems*. TIA/EIA Interim Standard. TIA/EIA/IS-707-A. Apr. 1999.

*Upper Layer (Layer 3) Signaling Standard for cdma2000 Spread Spectrum Systems, Release C*. TIA/EIA Interim Standard. TIA/EIA/IS-2000.5-C. May, 2002.

*Introduction to cdma2000 Spread Spectrum Systems, Release C*. TIA/EIA Interim Standard. TIA/EIA/IS-2000.1-C. May 2002.

Motorola, Version 1.0. *Motorola High Speed Data Air Interface Proposal Comparisions and Recommendations*. Jan. 27, 1997.

*Telecommunications Industry Association Meeting Summary*. Task Group I, Working Group III, Subcommittee TR45.5. Jan. 6-8, 1997. Newport Beach, California.

Shacham, et al., "A Selective-Repeat-ARQ Protocol for Parallel Channels and Its Resequencing Analysis," IEEE Transactions On Communications, XP000297814, 40 (4): 773-782 (Apr. 1997).

*Data Services Option Standard for Wideband Spread Spectrum Digital Cellular System*. TIA/EIA/IS-99. TIA/EIA Interim Standard. Jul. 1995.

\* cited by examiner

FAST ACQUISITION OF TRAFFIC CHANNELS FOR A HIGHLY VARIABLE DATA RATE REVERSE LINK OF A CDMA WIRELESS COMMUNICATION SYSTEM

RELATED APPLICATIONS

This application is a continuation of U.S. application Ser. No. 09/515,487, filed Feb. 29, 2000 now U.S. Pat. No. 6,452,913, entitled "Fast Acquisition of Traffic Channels for a Highly Variable Data Rate Reverse Link of a CDMA Wireless Communication System," which is a continuation in part of U.S. application Ser. No. 09/088,413 filed Jun. 1, 1998, now U.S. Pat. No. 6,222,832, entitled "Fast Acquisition of Traffic Channels for a Highly Variable Data Rate Reverse Link of a CDMA Wireless Communication System," which itself is related to a prior pending U.S. patent application Ser. No. 08/992,760 filed Dec. 17, 1997, now U.S. Pat. No. 6,081,536, entitled "Dynamic Bandwidth Allocation to Transmit a Wireless Protocol Across a Code Division Multiple Access (CDMA) Radio Link" and a prior pending U.S. patent application Ser. No. 08/992,759 filed Dec. 17, 1997, now U.S. Pat. No. 6,151,332, entitled "Protocol Conversion and Bandwidth Reduction Technique Providing Multiple nB+D ISDN Basic Rate Interface Links Over a Wireless Code Division Multiple Access Communication System," and a prior pending U.S. patent application Ser. No. 09/030,049 filed Feb. 24, 1998, now U.S. Pat. No. 6,236,647, entitled "Dynamic Frame Size Adjustment and Selective Reject On a Multi-Link Channel to Improve Effective Throughput and Bit Error Rate," each of which are assigned to the assignee of the present invention and all five of which are hereby incorporated by reference in their entirety.

BACKGROUND OF THE INVENTION

The increasing use of wireless telephones and personal computers has led to a corresponding demand for advanced telecommunication services that were once thought to only be meant for use in specialized applications. In the 1980's, wireless voice communication became widely available through the cellular telephone network. Such services were at first typically considered to be the exclusive province of the businessman because of expected high subscriber costs. The same was also true for access to remotely distributed computer networks, whereby until very recently, only business people and large institutions could afford the necessary computers and wireline access equipment. As a result of the widespread availability of both technologies, the general population now increasingly wishes to not only have access to networks such as the Internet and private intranets, but also to access such networks in a wireless fashion as well. This is particularly of concern for the users of portable computers, laptop computers, hand-held personal digital assistants and the like who would prefer to access such networks without being tethered to a telephone line.

There still is no widely available satisfactory solution for providing low cost, high speed access to the Internet, private intranets, and other networks using the existing wireless infrastructure. This situation is most likely an artifact of several unfortunate circumstances. For one, the typical manner of providing high speed data service in the business environment over the wireline network is not readily adaptable to the voice grade service available in most homes or offices. Such standard high speed data services also do not lend themselves well to efficient transmission over standard cellular wireless handsets. Furthermore, the existing cellular network was originally designed only to deliver voice services. As a result, the emphasis in present day digital wireless communication schemes lies with voice, although certain schemes such as CDMA do provide some measure of asymmetrical behavior for the accommodation of data transmission. For example, the data rate on an IS-95 forward traffic channel can be adjusted in increments from 1.2 kbps up to 9.6 kbps for so-called Rate Set 1 and in for increments from 1.8 kbps up to 14.4 kbps for Rate Set 2. On the reverse link traffic channel, however, the data rate is fixed at 4.8 kbps.

Existing systems therefore typically provide a radio channel which can accommodate maximum data rates only in the range of 14.4 kilobits per second (kbps) at best in the forward direction. Such a low data rate channel does not lend itself directly to transmitting data at rates of 28.8 or even 56.6 kbps that are now commonly available using inexpensive wireline modems, not to mention even higher rates such as the 128 kbps which are available with Integrated Services Digital Network (ISDN) type equipment. Data rates at these levels are rapidly becoming the minimum acceptable rates for activities such as browsing web pages. Other types of data networks using higher speed building blocks such as Digital Subscriber Line (xDSL) service are just now coming into use in the United States. However, their costs have only been recently reduced to the point where they are attractive to the residential customer.

Although such networks were known at the time that cellular systems were originally deployed, for the most part, there is no provision for providing higher speed ISDN- or xDSL-grade data services over cellular network topologies. Unfortunately, in wireless environments, access to channels by multiple subscribers is expensive and there is competition for them. Whether the multiple access is provided by the traditional Frequency Division Multiple Access (FDMA) using analog modulation on a group of radio carriers, or by newer digital modulation schemes the permit sharing of a radio carrier using Time Division Multiple Access (TDMA) or Code Division Multiple Access (CDMA), the nature of the radio spectrum is that it is a medium that is expected to be shared. This is quite dissimilar to the traditional environment for data transmission, in which the wireline medium is relatively inexpensive to obtain, and is therefore not typically intended to be shared.

Other considerations are the characteristics of the data itself. For example, consider that access to web pages in general is burst-oriented, with asymmetrical data rate transmission requirements. In particular, the user of a remote client computer first specifies the address of a web page to a browser program. The browser program then sends this web page address data, which is typically 100 bytes or less in length, over the network to a server computer. The server computer then responds with the content of the requested web page, which may include anywhere from 10 kilobytes to several megabytes of text, image, audio, or even video data. The user then may spend at least several seconds or even several minutes reading the content of the page before requesting that another page be downloaded. Therefore, the required forward channel data rates, that is, from the base station to the subscriber, are typically many times greater than the required reverse channel data rates.

In an office environment, the nature of most employees' computer work habits is typically to check a few web pages and then to do something else for extended period of time, such as to access locally stored data or to even stop using the computer altogether. Therefore, even though such users may expect to remain connected to the Internet or private intranet continuously during an entire day, the actual overall nature of the need to support a required data transfer activity to and from a particular subscriber unit is actually quite sporadic.

SUMMARY OF THE INVENTION

Problem Statement

What is needed is an efficient scheme for supporting wireless data communication such as from portable computers to computer networks such as the Internet and private intranets using widely available infrastructure. Unfortunately, even the most modern wireless standards in widespread use such as CDMA do not provide adequate structure for supporting the most common activities, such as web page browsing. In the forward link direction, the maximum available channel bandwidth in an IS-95 type CDMA system is only 14.4 kbps. In the reverse link direction, data rates are fixed at 4.8 kbps, meaning that it is possible to support only about 100 subscribers at the same time on a 1.25 MHz bandwidth radio frequency carrier signal.

In addition, the existing CDMA system requires certain operations before a channel can be used. Both access and traffic channels are non-coherently modulated by so-called long code pseudonoise (PN) sequences; therefore, in order for the receiver to work properly it must first be synchronized with the transmitter. The setting up and tearing down of channels therefore requires overhead to perform such synchronization. This overhead results in a noticeable delay to the user of the subscriber unit.

The sharing of channels in both the forward and reverse link directions is therefore an attractive option, especially with the ease of obtaining multiple access with CDMA; additional users can be supported by simply adding additional codes or code phases. Ideally, this subchannel overhead would be minimized so that when additional subchannels need to be allocated to a connection, they are available as rapidly as possible.

It is therefore advantageous to provide the sub-channels in such a way that the lowest possible speed connection is provided on a reverse link while at the same time maintaining efficient and fast ramp-up of additional code phase channels on demand. This in turn would maximize the number of available connections while minimizing the impact on the overall system capacity.

BRIEF DESCRIPTION OF THE INVENTION

The present invention is a service option overlay for a CDMA wireless communication system which accomplishes the above requirements. In particular, a number of subchannels for a forward link are defined within a single CDMA radio channel bandwidth, such as by assigning different orthogonal codes to each sub-channel. Multiple subchannels are defined on the reverse link by assigning different code phases of a given long pseudonoise (PN) code to each subchannel. The instantaneous bandwidth needs of each on-line subscriber unit are then met by dynamically allocating none, one, or multiple subchannels on an as needed basis for each network layer connection.

More particularly, the present invention efficiently provides a relatively large number of virtual physical connections between the subscriber units and the base stations on the reverse link for extended idle periods such as when computers connected to the subscriber units are powered on, but not presently actively sending or receiving data. These maintenance subchannels permit the base station and the subscriber units to remain in phase and time synchronism. This in turn allows fast acquisition of additional subchannels as needed by allocating new code phase subchannels. Preferably, the code phases of the new channels are assigned according to a predetermined code phase relationship with respect to the code phase of the corresponding maintenance subchannel.

In an idle mode, the subscriber unit sends a synchronization or "heartbeat" message on the maintenance subchannel at a data rate which need only be fast enough to allow the subscriber unit to maintain synchronization with the base station. The duration of the heartbeat signal is determined by considering the capture or locking range of the code phase locking circuits in the receiver at the base station.

For example, the receiver typically has a PN code correlator running at the code chip rate. One example of such a code correlator uses a delay lock loop consisting of an early-late detector. A loop filter controls the bandwidth of the loop which in turn determines how long the code correlator must be allowed to operate before it can guarantee phase lock. This loop time constant determines the amount of "jitter" that can be tolerated; phase lock is typically considered to be maintainable when this is equal to a fraction of a chip time, such as about ⅛ of a chip time.

The heartbeat messages are preferably sent in time slots formed on the subchannels defined by the code phases. The use of time slotting allows a minimum number of dedicated base station receivers to maintain the idle reverse links. In particular, the reverse channel links are provided using multiple phases of the same long code as well as by assigning a time slot on such code to each subscriber unit. This reduces the overhead of maintaining a large number of connections at the base station.

Because of the time slotted nature of the reverse channel, the base station receiver can also be time shared among the various reverse links. To permit this, during each time slot allocated to a particular subscriber unit, the base station receiver first loads information concerning the last known state of its phase lock such as the last known state of early-late correlators. It then trains the early-late correlators for the required time to ensure that phase lock is still valid, and stores the state of the correlators at the end of the time slot.

When additional subchannels are required to meet bandwidth demand, the additional code phases are assigned in a predetermined phase relationship with respect to the locked code in order to minimize overhead transmissions which would otherwise be needed from the base station traffic channel processor. As a result, many thousands of idle subscriber units may be supported on a single CDMA reverse link radio channel while at the same time minimizing start up delay when channels must be allocated.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
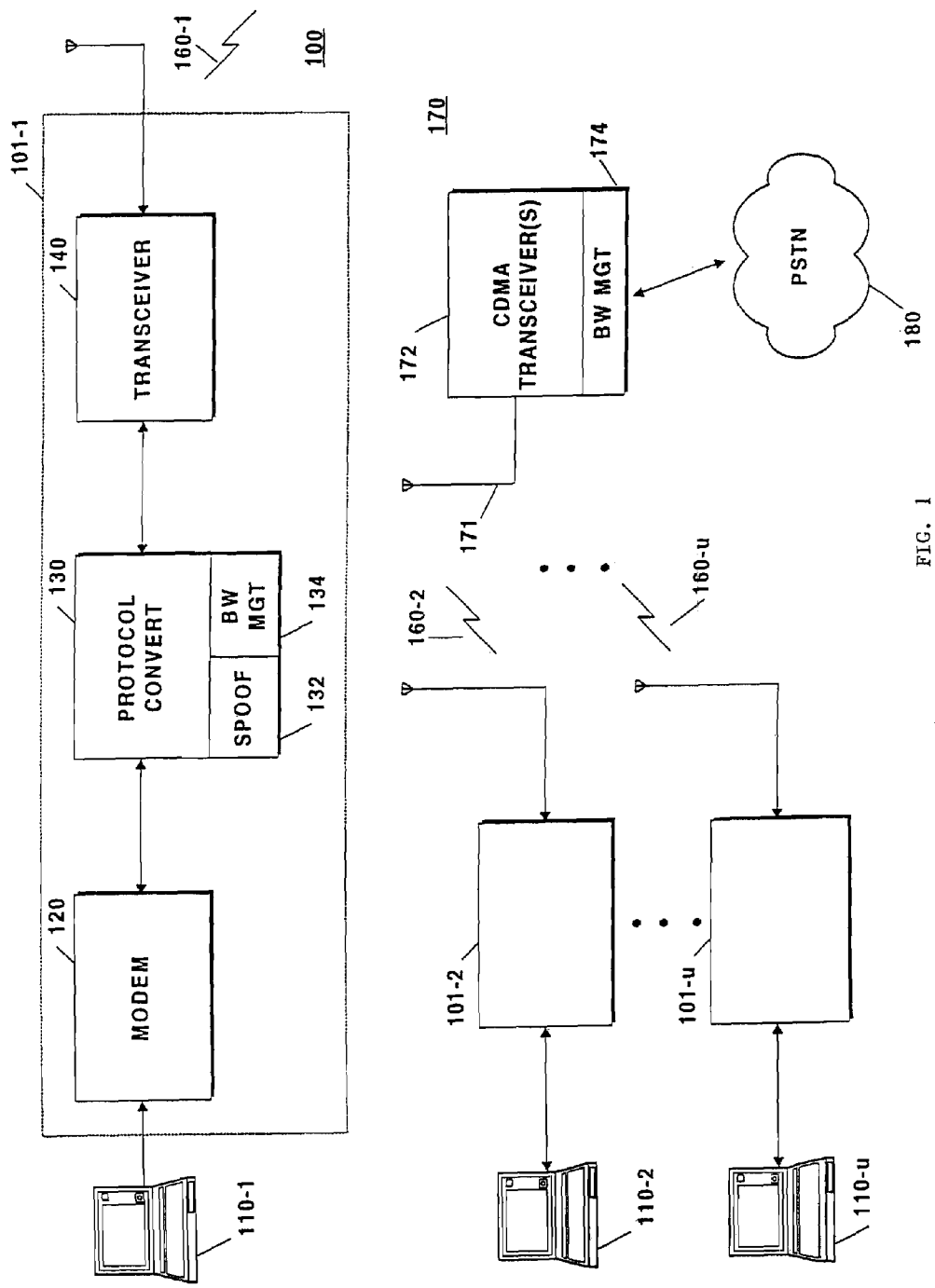
FIG. 1 is a block diagram of a wireless communication system making use of a bandwidth management scheme according to the invention.

Turning attention now to the drawings more particularly, FIG. 1 is a block diagram of a system 100 for providing high speed data and voice service over a wireless connection by seamlessly integrating a digital data protocol such as, for example, Integrated Services Digital Network (ISDN) with a digitally modulated wireless service such as Code Division Multiple Access (CDMA).

The system 100 consists of two different types of components, including subscriber units 101-1, 101-2, . . . , 101-u (collectively, the subscriber units 101) and one or more base stations 170. The subscriber units 101 and base stations 170 cooperate to provide the functions necessary in order to provide wireless data services to a portable computing device 110 such as a laptop computer, portable computer, personal digital assistant (PDA) or the like. The base station 170 also cooperates with the subscriber units 101 to permit the ultimate transmission of data to and from the subscriber unit and the Public Switched Telephone Network (PSTN) 180.

More particularly, data and/or voice services are also provided by the subscriber unit 101 to the portable computer 110 as well as one or more other devices such as telephones 112-1, 112-2 (collectively referred to herein as telephones 112). The telephones 112 themselves may in turn be connected to other modems and computers which are not shown in FIG. 1. In the usual parlance of ISDN, the portable computer 110 and telephones 112 are referred to as terminal equipment (TE). The subscriber unit 101 provides the functions referred to as a network termination type 1 (NT-1). The illustrated subscriber unit 101 is in particular meant to operate with a so-called basic rate interface (BRI) type ISDN connection that provides two bearer or "B" channels and a single data or "D" channel with the usual designation being 2B+D.

The subscriber unit 101 itself consists of an ISDN modem 120, a device referred to herein as the protocol converter 130 that performs the various functions according to the invention including spoofing 132 and bandwidth management 134, a CDMA transceiver 140, and subscriber unit antenna 150. The various components of the subscriber unit 101 may be realized in discrete devices or as an integrated unit. For example, an existing conventional ISDN modem 120 such as is readily available from any number of manufacturers may be used together with existing CDMA transceivers 140. In this case, the unique functions are provided entirely by the protocol converter 130 which may be sold as a separate device. Alternatively, the ISDN modem 120, protocol converter 130, and CDMA transceiver 140 may be integrated as a complete unit and sold as a single subscriber unit device 101. Other types of interface connections such as Ethernet or PCMCIA may be used to connect the computing device to the protocol converter 130.

The ISDN modem 120 converts data and voice signals between the terminal equipment 110 and 112 to format required by the standard ISDN "U" interface. The U interface is a reference point in ISDN systems that designates a point of the connection between the network termination (NT) and the telephone company.

The protocol converter 130 performs spoofing 132 and basic bandwidth management 134 functions. In general, spoofing 132 consists of insuring that the subscriber unit 101 appears to the terminal equipment 110, 112 that is connected to the public switched telephone network 180 on the other side of the base station 170 at all times. The bandwidth management function 134 is responsible for allocating and deallocating CDMA radio channels 160 as required. Bandwidth management 134 also includes the dynamic management of the bandwidth allocated to a given session by dynamically assigning sub-portions of the CDMA radio channels 160 in a manner which is more fully described below.

The CDMA transceiver 140 accepts the data from the protocol converter 130 and reformats this data in appropriate form for transmission through a subscriber unit antenna 150 over CDMA radio link 160-1. The CDMA transceiver 140 may operate over only a single 1.25 MHz radio frequency channel or, alternatively, in a preferred embodiment, may be tunable over multiple allocatable radio frequency channels.

CDMA signal transmissions are then received and processed by the base station equipment 170. The base station equipment 170 typically consists of multichannel antennas 171, multiple CDMA transceivers 172, and a bandwidth management functionality 174. Bandwidth management 174 controls the allocation of CDMA radio channels 160 and sub-channels, in a manner analogous to the subscriber unit 101. The base station 170 then couples the demodulated radio signals to the Public Switch Telephone Network (PSTN) 180 in a manner which is well known in the art. For example, the base station 170 may communicate with the PSTN 180 over any number of different efficient communication protocols such as primary rate ISDN, or other LAPD based protocols such as IS-634 or V5.2.

It should also be understood that data signals travel bidirectionally across the CDMA radio channels 160. In other words, data signals received from the PSTN 180 are coupled to the portable computer 110 in a forward link direction, and data signals originating at the portable computer 110 are coupled to the PSTN 180 in a so-called reverse link direction. The present invention involves in particular the manner of implementing the reverse link channels.

Continuing to refer to FIG. 1 briefly, spoofing 134 therefore involves having the CDMA transceiver 140 loop back these synchronous data bits over the ISDN communication path to spoof the terminal equipment 110, 112 into believing that a sufficiently wide wireless communication link 160 is continuously available. However, only when there is actually data present from the terminal equipment to the wireless transceiver 140 is wireless bandwidth allocated. Therefore, the network layer need not allocate the assigned wireless bandwidth for the entirety of the communications session. That is, when data is not being presented upon the terminal equipment to the network equipment, the bandwidth management function 134 deallocates initially assigned radio channel bandwidth 160 and makes it available for another transceiver and another subscriber unit 101.

Figure 2:
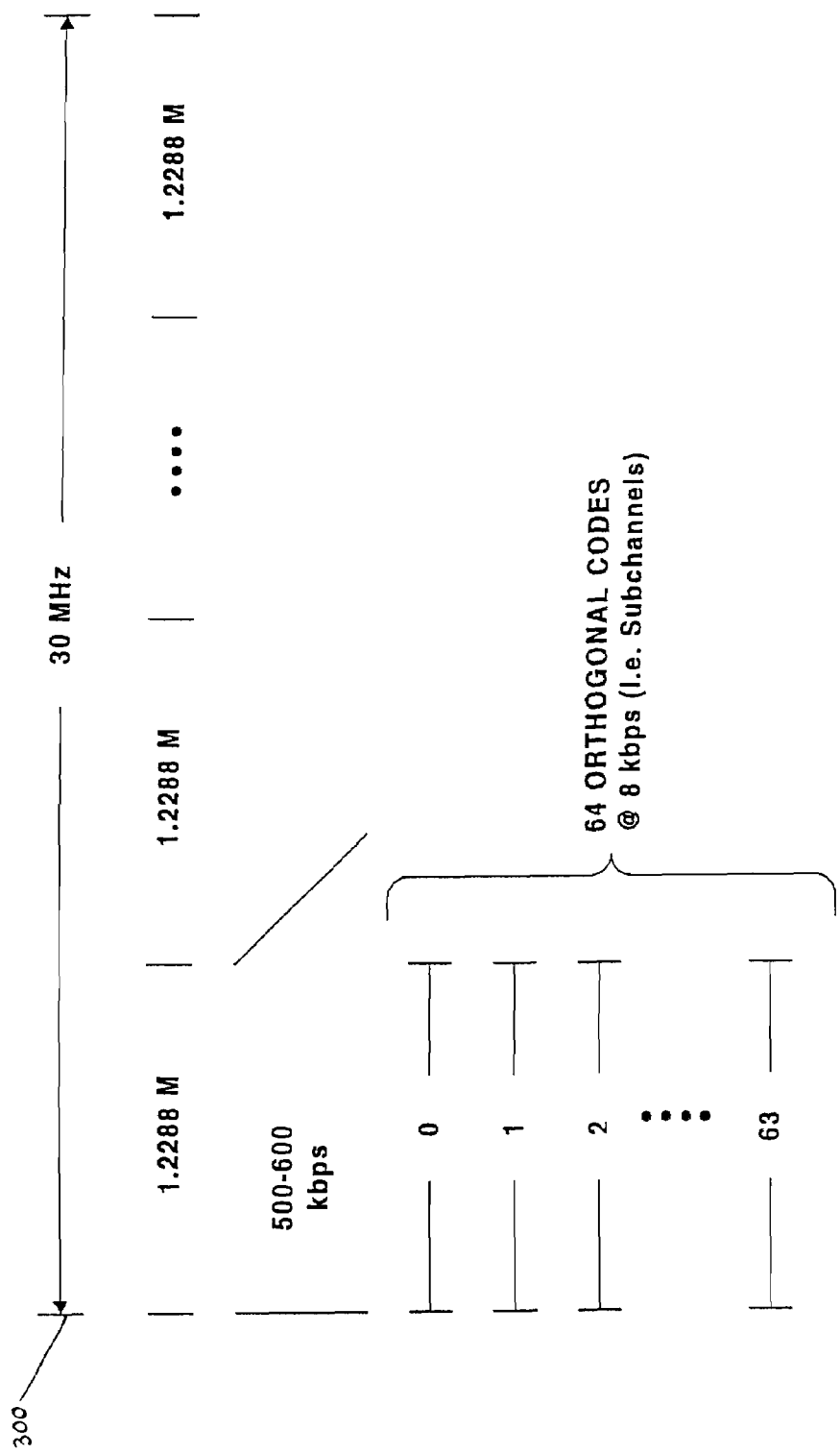
FIG. 2 is a diagram showing how subchannels are assigned within a given radio forward link frequency (RF) channel.

In order to better understand how bandwidth management 134 and 174 accomplish the dynamic allocation of radio channels, turn attention now to FIG. 2. This figure illustrates one possible frequency plan for the wireless links 160 according to the invention. In particular, a typical transceiver 170 can be tuned on command to any 1.25 MHz channel within a much larger bandwidth, such as up to 30 MHz. In the case of location in an existing cellular radio frequency bands, these bandwidths are typically made available in the range of from 800 to 900 MHz. For personal communication systems (PCS) type wireless systems, the bandwidth is typically allocated in the range from about 1.8 to 2.0 GigaHertz (GHz). In addition, there are typically two matching bands active simultaneously, separated by a guard band, such as 80 MHz; the two matching bands form forward and reverse full duplex link.

Each of the CDMA transceivers, such as transceiver 140 in the subscriber unit 101, and transceivers 172 in the base station 170, are capable of being tuned at any given point in time to a given 1.25 MHz radio frequency channel. It is generally understood that such 1.25 MHz radio frequency carrier provides, at best, a total equivalent of about 500 to 600 kbps maximum data rate transmission within acceptable bit error rate limitations.

In contrast to this, the present invention subdivides the available approximately 500 to 600 kbps data rate into a relatively large number of subchannels. In the illustrated example, the bandwidth is divided into sixty-four (64) subchannels 300, each providing an 8 kbps data rate. A given subchannel 300 is physically implemented by encoding a transmission with one of a number of different assignable pseudorandom codes. For example, the 64 subchannels 300 may be defined within a single CDMA RF carrier by using a different orthogonal code for each defined subchannel 300.

As mentioned above, subchannels 300 are allocated only as needed. For example, multiple subchannels 300 are granted during times when a particular ISDN subscriber unit 101 is requesting that large amounts of data be transferred. These subchannels 300 are quickly released during times when the subscriber unit 101 is relatively lightly loaded.

The present invention relates in particular to maintaining the reverse link so that synchronization of the subchannels does not need to be reestablished each time that channels are taken away and then granted back.

Figure 3:
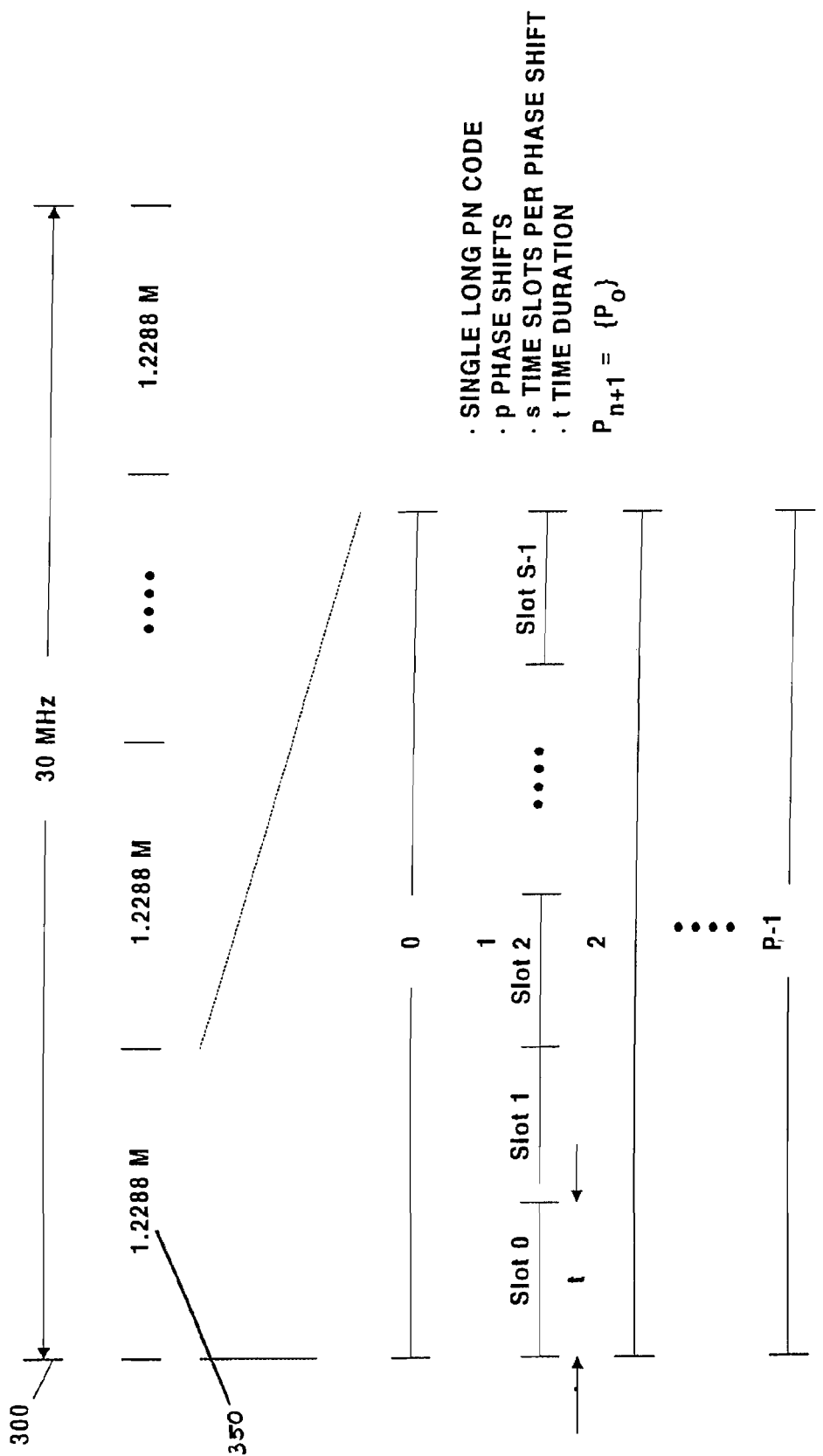
FIG. 3 is a diagram showing how subchannels are assigned within a given reverse link RF channel.

FIG. 3 is a diagram illustrating the arrangement of how the subchannels are assigned on the reverse link. It is desirable to use a single radio carrier signal on the reverse link to the extent possible to conserve power as well as to conserve the receiver resources which must be made available at the base station. Therefore, a single 1.2288 MHz band 350 is selected out of the available radio spectrum.

A relatively large number, N, such as 1000 individual subscriber units are then supported by using a single long pseudonoise (PN) code in a particular way. First, a number, p, of code phases are selected from the available $2^{42}-1$ different code phases. The p code phase shifts are then used to provide p subchannels. Next, each of the p subchannels are further divided into s time slots. Therefore, the maximum supportable number of supportable subscriber units, N, is p times s. Use of the same PN code with different phases and time slots provides many different subchannels with permits using a single rake receiver in the base station 104.

In the above mentioned channel allocation scheme, radio resources are expected to be allocated on an as-needed basis. However, consideration must also be given to the fact that normally, in order set up a new CDMA channel, a given reverse link channel must be given time to acquire code phase lock at the receiver. The present invention avoids the need to wait for each channel to acquire code phase lock each time that it is set up by several mechanisms which are describe more fully below. In general, the technique is to send a maintenance signal at a rate which is sufficient to maintain code phase lock for each subchannel even in the absence of data.

The objective here is to minimize the size of each time slot, which in turn maximizes the number of subscribers that can be maintained in an idle mode. The size, t, of each time slot is determined by the minimum time that it takes to guarantee phase lock between the transmitter at the subscriber unit and the receiver in the base station. In particular, a code correlator in the receiver must receive a maintenance or "heartbeat" signal consisting of at least a certain number of maintenance bits over a certain unit of time. In the limit, this heartbeat signal is sent by sending at least one bit from each subscriber unit on each reverse link at a predetermined time, e.g., its designated time slot on a predetermined one of the N subchannels.

The minimum time slot duration, t, therefore depends upon a number of factors including the signal to noise ratio and the expected maximum velocity of the subscriber unit within the cell. With respect to signal to noise ratio, this depends on $$Eb/No+Io$$

where Eb is the energy per bit, No is the ambient noise floor, and Io is the mutual interference from other coded transmissions of the other sub-channels on the reverse link sharing the same spectrum. Typically, to close the link requires integration over 8 chip times at the receiver, and a multiple of 20 times that is typically needed to guarantee detection. Therefore, about 160 chip times are typically required to correctly receive the coded signal on the reverse link. For a 1.2288 MHz code, Tc, the chip time, is 813.33 ns, so that this minimum integration time is about 130 μs. This in turn sets the absolute minimum duration of a data bit, and therefore, the minimum duration of a slot time, t. The minimum slot time of 130 μs means that at a maximum, 7692 time slots can be made available per second for each phase coded signal.

To be consistent with certain power control group timing requirements, the time slot duration can be relaxed somewhat. For example, in the IS-95 standard, a power control group timing requirement requires a power output sample from each subscriber unit every 1.25 ms. Even in such an implementation, approximately 1.25 ms/130 μs, or at least 961 time slots can be made available on each code phase carrier.

Once code phase lock is acquired, the duration of the heartbeat signal is determined by considering the capture or locking range of the code phase locking circuits in the receiver at the base station. For example, the receiver typically has a PN code correlator running at the code chip rate. One example of such a code correlator uses a delay lock loop consisting of an early-late detector. A loop filter controls the bandwidth of this loop which in turn determines how long the code correlator must be allowed to operate before it can guarantee phase lock. This loop time constant determines the amount of "jitter" that can be tolerated in the code correlator, such as about ⅛ of a chip time, Tc.

In the preferred embodiment, the system 100 is intended to support so-called nomadic mobility. That is, high mobility operation within moving vehicles typical of cellular telephony is not expected to be necessary. Rather, the typical user of a portable computer who is active is moving at only brisk walking speeds of about 4.5 miles per hour (MPH). At 4.5 MPH, corresponding to a velocity of 6.6 feet per second, a user will move 101 feet in ⅛ of the 1/1.2288 MHz chip time (Tc). Therefore, it will take about 101 feet divided by 6.6 feet, or about 15 seconds for such a user to move distance which is sufficiently far for him to a point where the code phase synchronization loop cannot be guaranteed to remain locked. Therefore, as long as a complete synchronization signal is sent for a given reverse link channel every 15 seconds, the reverse link loop will therefore remain in lock.

Figure 4:
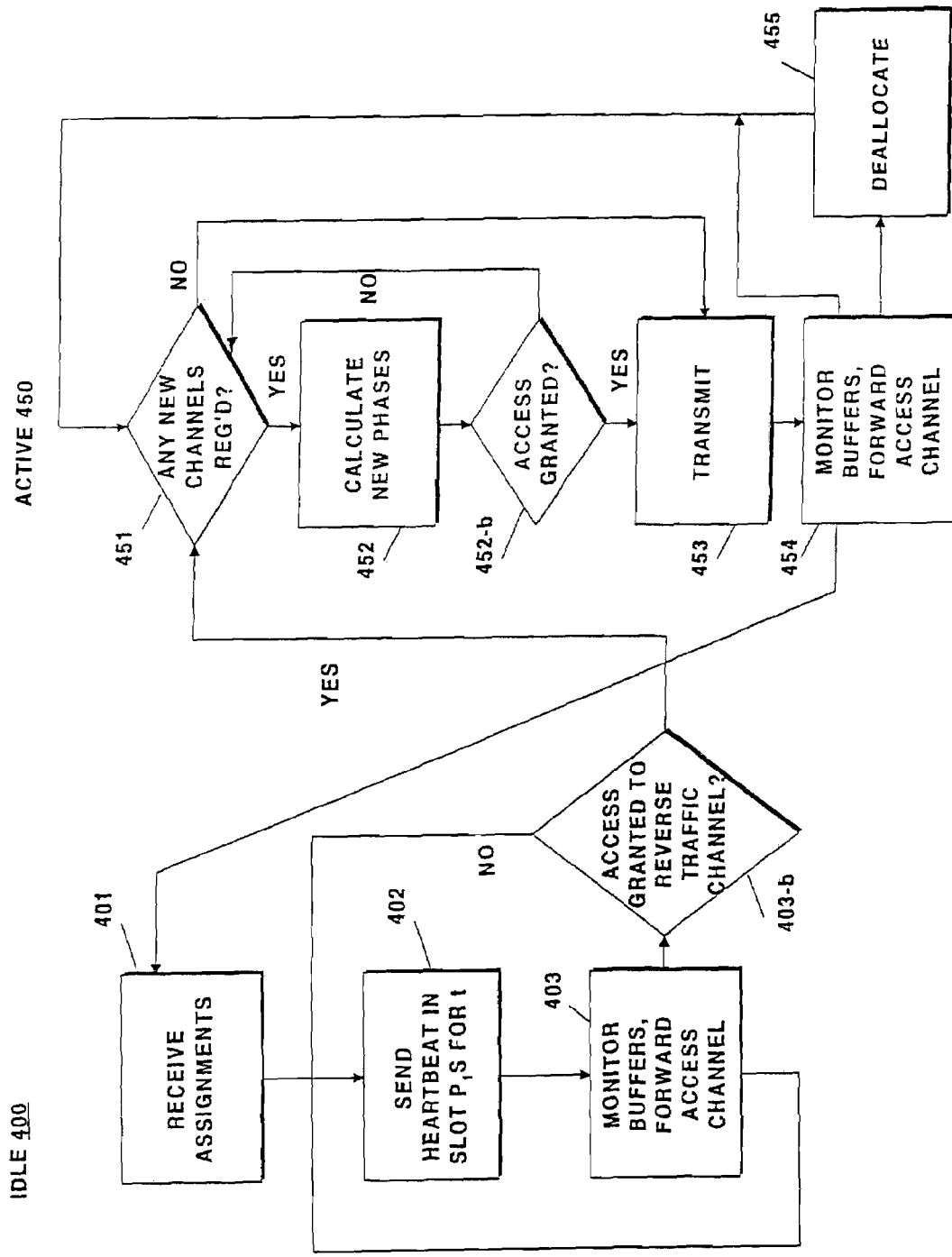
FIG. 4 is a state diagram for a reverse link bandwidth management function in the subscriber unit.

FIG. 4 is a state diagram for a reverse link bandwidth management function in the subscriber unit. In an idle mode 400, a first state 401 is entered in which the subscriber unit receives a time slot assignment for its idle or fundamental channel in the form of a phase code, p, and a time slot, s.

In a next state 402, the heartbeat signal is sent in the assigned time slots. A state 403 is then entered in which the subscriber unit monitors its internal data buffers to determine whether additional code phase channels are required to support the establishment of a reverse link with sufficient bandwidth to support and active traffic channel. If this is not the case, then the subscriber returns to state 402 and remains in the idle mode 400.

If, however, the subscriber unit does have data to be sent, then the active mode 450 is entered. In the first state 451 of this mode, if new code phase channels are required, then new code phases are calculated in state 452. Specifically, the subscriber unit knows that it is assigned code phase channels in a predetermined relationship to the code phase channel of its fundamental channel, i.e., $$P_{n+1} = \mathscr{F}\{P_o\}$$

where $P_{n+1}$ is the code phase for the new channel (n+1), and $P_o$ is the code phase assigned to the fundamental channel for the particular subscriber. Such a code phase relationship $\mathscr{F}$ may be, for example, to select uniformly from the available $2^{42}$ codes, every $2^{42}/2^{10}$'th or every $2^{32}$'th code phase in a system which is supporting 1024 ($2^{10}$) reverse links.

A number, C, of these new code phases are therefore instantaneously calculated based simply upon the number of additional code phase channels, and without the need to require code phase synchronization for each new channel.

In a next state 453, the subscriber unit begins transmitting its data on its assigned code phase channels. In state 454, it continues to monitor its internal data buffers and its associated forward access channel to determine when to return to the idle mode 400, to state 451, to determine if new code phase channels must be assigned, or to state 455, where they are deallocated.

Figure 5:
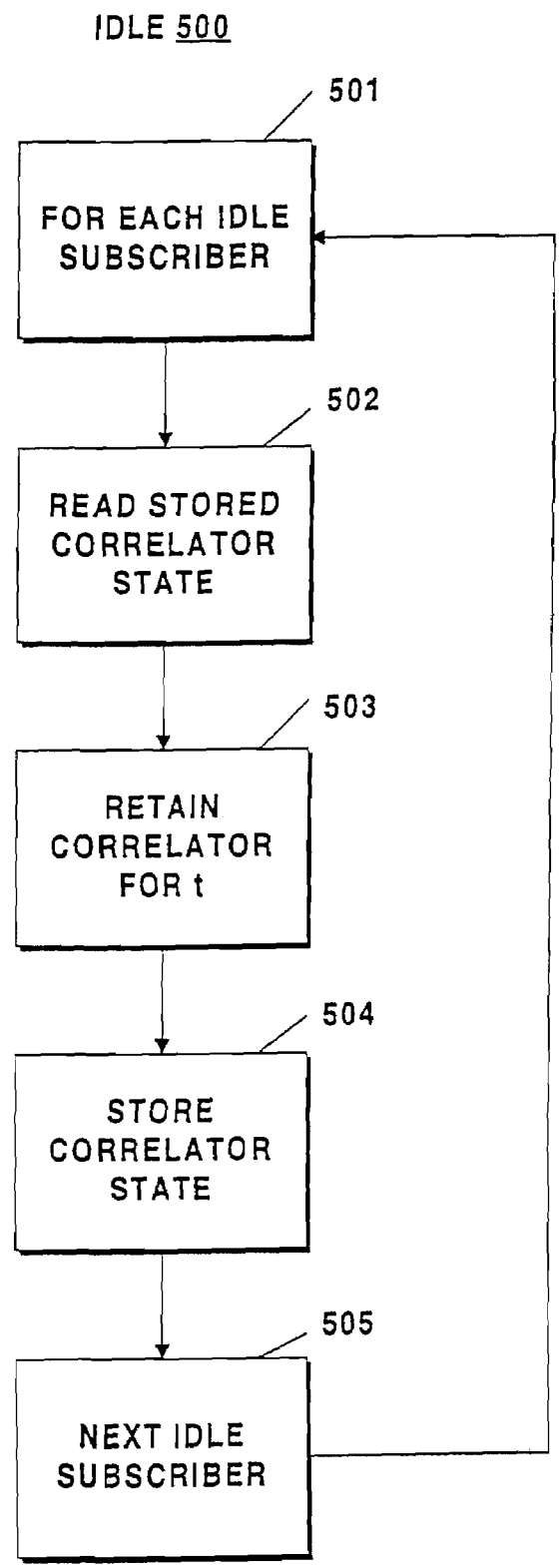
FIG. 5 is a state diagram of the reverse link bandwidth management function in the base station.

FIG. 5 is a state diagram of idle mode processing in the reverse link management function in the base station 104. In a first state 501, for each idle subscriber unit 101, a state 502 is entered in which a stored state of the correlators for the present time slot (p,s) from a previous synchronization session is read. In a next state 503, an early-late correlator is retrained for the time slot duration, t. In a next state 504, the correlator state is stored; in state 505, the loop is continued for each subscriber.

While this invention has been particularly shown and described with references to preferred embodiments thereof, it will be understood by those skilled in the art that various changes in form and details may be made therein without departing from the scope of the invention encompassed by the appended claims.

What is claimed is:

1. A code division multiple access (CDMA) user device comprising:
   an antenna; and
   a controller configured to control a CDMA transceiver such that a CDMA connection with a network is established in accordance with a protocol architecture, the protocol architecture having a plurality of protocol layers including a physical layer, a CDMA control channel is established, data is transmitted over allocable code channels wherein the code channels are divided in time by radio frames that are further subdivided into subframes, code channels are allocated on a sub-frame basis to support the transmitted data wherein allocation of code channels includes adding and removing code channels assigned to the CDMA user device, and the network connection is maintained when the CDMA user device does not have any allocated code channels to transmit the data, wherein a state of at least one of the plurality of protocol layers above the physical layer is maintained during the CDMA connection after all of the allocable code channels assigned to the CDMA user device are released.

2. The CDMA user device according to claim 1 wherein the sub-frame includes at least one time slot.

3. The CDMA user device according to claim 1 wherein the CDMIA transceiver is configured to operate over a plurality of allocable radio frequency channels.

4. The CDMA user device according to claim 1 wherein the CDMA control channel enables the code channels to be reallocated without reestablishing a code phase lock over the CDMA connection when the transceiver is not actively sending data.

5. The CDMA user device according to claim 1 wherein a bandwidth management function is configured for allocating the code channels on an as-needed basis, with the number of allocable code channels being variable during a duration of a communication session.

6. The CDMA user device according to claim 5 wherein the bandwidth management function is configured to deallocate an initially assigned code channel when there is no data to transmit from the CDMA user device.

7. The CDMA user device according to claim 1 wherein the CDMA transceiver sends a message over the CDMA control channel to facilitate a higher data service rate.

8. The CDMA user device according to claim 1, further comprising:
   a modem configured to establish a communications session over the CDMA connection wherein the modem is configured to convert data and voice signals to a standard format.

9. The CDMA user device according to claim 1 wherein the data includes web browser data which is displayed on the CDMA user device.

* * * * *

UNITED STATES PATENT AND TRADEMARK OFFICE
CERTIFICATE OF CORRECTION

PATENT NO. : 7,602,749 B2  Page 1 of 1
APPLICATION NO. : 10/179121
DATED : October 13, 2009
INVENTOR(S) : James A. Proctor, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1385 days.

Signed and Sealed this

Fifth Day of October, 2010

David J. Kappos
*Director of the United States Patent and Trademark Office*